(12) United States Patent
Ford et al.

(10) Patent No.: US 9,116,967 B2
(45) Date of Patent: Aug. 25, 2015

(54) METHODS AND APPARATUS TO INTERFACE AN APPLICATION TO A DATABASE

(75) Inventors: Justin Michael Ford, San Jose, CA (US); Michael Hale, Fremont, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 10 days.

(21) Appl. No.: 13/210,140

(22) Filed: Aug. 15, 2011

(65) Prior Publication Data

US 2013/0046787 A1 Feb. 21, 2013

(51) Int. Cl.
*G06F 17/30* (2006.01)

(52) U.S. Cl.
CPC .................. *G06F 17/3056* (2013.01)

(58) Field of Classification Search
USPC .......................... 707/779, 758, 769
See application file for complete search history.

(56) References Cited

U.S. PATENT DOCUMENTS

| | | | |
|---|---|---|---|
| 5,664,173 A * | 9/1997 | Fast .............................. | 707/694 |
| 6,732,360 B1 | 5/2004 | Seo et al. | |
| 6,877,066 B2 | 4/2005 | Benfield et al. | |
| 7,693,900 B2 | 4/2010 | Wilmering et al. | |
| 7,797,709 B2 | 9/2010 | Handa et al. | |
| 2004/0024764 A1* | 2/2004 | Hsu et al. ......................... | 707/9 |
| 2004/0230571 A1* | 11/2004 | Robertson ....................... | 707/3 |
| 2005/0108521 A1 | 5/2005 | Silhavy et al. | |
| 2005/0114299 A1* | 5/2005 | Bharat .............................. | 707/2 |
| 2006/0167760 A1* | 7/2006 | Chakraborty et al. .......... | 705/26 |
| 2008/0320441 A1 | 12/2008 | Ahadian et al. | |
| 2010/0094829 A1* | 4/2010 | Castellanos et al. .......... | 707/705 |
| 2011/0023055 A1 | 1/2011 | Thatte et al. | |

OTHER PUBLICATIONS

DbVis Software AB, "DbVisualizer: The Universal Database Tool," 2010, Stockholm, Sweden, (2 pages).
Data Direct, "Type 5 JDBC Drivers vs Type 4 at a Glance," 2010, (2 pages).

* cited by examiner

*Primary Examiner* — Monica Pyo
(74) *Attorney, Agent, or Firm* — Hanley, Flight & Zimmerman (57) ABSTRACT

Methods and apparatus to interface an application to a database are disclosed. An example method includes determining a query used by an application that is to communicate with a database via a database driver. The query is tested on the database via the database driver. Such testing includes storing a query template when a received result of the query matches an expected result of the query. A database access framework is generated to interface between the application and the database driver based on the stored query template.

15 Claims, 7 Drawing Sheets

METHODS AND APPARATUS TO INTERFACE AN APPLICATION TO A DATABASE

BACKGROUND

Some software applications query a database for information retrieval and/or storage. Queries use specialized syntaxes and/or formats to communicate with a database. Different types of databases use different syntaxes and/or formats for communication. In some cases, a syntax describes a Data Manipulation Language (DML), while in other cases, a syntax describes a Data Description Language (DDL). DML statements direct retrieval or modification of information and/or data stored in a database. DDL statements direct creation, modification, and/or deletion of definitions of objects (e.g., tables, views, etc.) in a database.

DETAILED DESCRIPTION

Many software applications are designed to utilize a single database query syntax and/or format. Thus, the syntax and/or format of the software application may not match the syntax and/or format of a particular database. When the syntax and/or format of the software application does not match the syntax and/or format of the database, the software application may execute an incorrect statement on the database, thereby causing an unintended result.

Applications are typically written for a single type of database. For example, an application might be written to interface with a SQL database, an Oracle database, a Sybase database, etc. Since many different types of databases exist, the application may not be able to communicate with a database that is already installed at a customer location. When a syntax and/or format mismatch between an application and a database occurs, the application might not be able to communicate with the database.

Some potential solutions to syntax and/or format mismatch include programming the application to interact with more than one desired type of database. In some cases, this approach is not desired as many different types of databases exist, and programming the application to interact with more than one type of database may increase the cost of the application due to additional planning, programming, and/or testing. Some other potential solutions include installing a new database that is supported by the application. This too, is not always a desired approach. For example, customers deploying the application may have a pre-existing system and/or a pre-existing database. Installing the new database that is supported by the database application in some examples includes repurposing hardware to support the database, purchasing new hardware to support the database, and/or installing the new database alongside the pre-existing database. Such approaches may cause additional expenses and/or lower performance from the customer's existing hardware.

Example methods, apparatus, and articles of manufacture to interface an application to a database that overcome syntax and/or format mismatch are disclosed herein. Examples disclosed herein test a database with queries known to be used by an application and transform those queries using query templates until an expected result is returned. A database access framework is then generated using the query templates that return the expected results. The example database access framework receives a query from the application, translates the query, executes the query on the database, and transmits a result of the query to the application.

Some example database access frameworks disclosed herein are created by a framework generator. The framework generator, being knowledgeable of the application and the queries that will be executed against a database, executes test queries against the database and analyzes the results. The results are analyzed to ensure that they sufficiently match expected results of the queries that will be executed against the database. Based on the results of the test queries, the framework generator creates the database access framework. The application is then configured to route queries via the database access framework.

Figure 1:
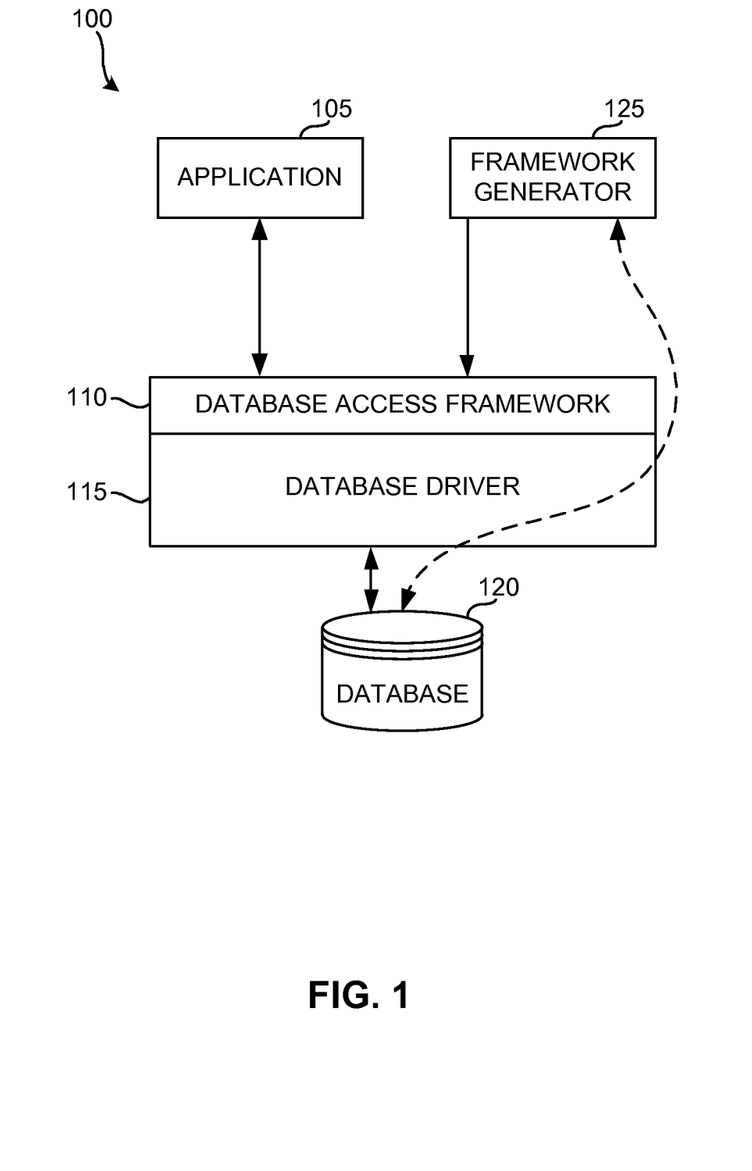
FIG. 1 is a schematic illustration of an example system including an example framework generator and an example database access framework.

FIG. 1 is a schematic illustration of an example system 100 in which an application 105 is executed. The example system 100 of FIG. 1 includes the application 105, a database access framework 110, a database driver 115, a database 120, and a framework generator 125.

The example application 105 is a database application that retrieves, stores, and/or presents information associated with and/or stored in the database 120. In the illustrated example, the application 105 is a client application that queries the database 120 and displays an interface to a user. However, in some examples, the application 105 is a server application that may serve data to a client application. For example, the application 105 may be a Web server. When the application 105 is a server application, the application 105 transmits information to a client application (e.g., a browser) such that the client application displays an interface to the user.

The application 105 of FIG. 1 interacts with the database 120 via the database driver 115. In the illustrated example, the application 105 is a Java™ application. However, any other type of application or programming language may additionally or alternatively be used. For example, the application 105 might be written in C++, Perl, etc.

The database driver 115 of illustrated example is a Java database connectivity (JDBC) driver. However, any other type of database driver 115 may additionally or alternatively be used. For example, the database driver 115 may be an Object Linking and Embedding database driver (OLE DB), and/or an Open Database Connectivity driver (ODBC). Many different types of database drivers exist. The database drivers 115 may be selected for use in the system 100 based on system compatibility, stability, etc. Database drivers 115 may or may not support queries (e.g., certain types of DDL and/or DML statements) and/or metadata used by the database 120 and/or the application 105.

To enable support for queries and/or metadata used by the database 120 and/or the application 105, the database access framework 110 is configured to interpret a query of the application 105, and translate the queries into a syntax that is implemented by the database driver 115 and/or the database 120. In some cases, information conveyed in DDL statements includes metadata that is useful to some applications. Many applications do not utilize metadata, and therefore many database drivers do not correctly support DDL statements for retrieving metadata. However, in some cases, transforming the DML and/or DDL statements to use a modified syntax enables the database driver to properly retrieve data, such as metadata, from the database.

The database access framework 110 of the illustrated example is created by the framework generator 125. The example database access framework 110 disclosed herein is a wrapper that interfaces with the database 115 driver and the application 105. The database driver 115 provides an application programming interface (API) so that the application 105 can interact with the database. The database access framework 110 receives a query from the application 105, and translates the query from a syntax of the application 105 to a syntax of the database 120.

The database access framework 110 receives queries from the application 105, translates the received queries, transmits the translated queries, and replies to the application 105 with a received result of the translated queries. The application 105 is configured to transmit a query the database access framework 110. The database access framework 110 translates the received query based on one or more query templates stored as part of the database access framework 110. The stored templates are generated by the framework generator 125 based on knowledge of the queries used by the application 105.

The database 120 of the illustrated example is a SQL database. However, the database 120 may be any other type of database such as, for example, an Oracle database, a Sybase database, etc. Furthermore, the data stored in the database 120 may be in any data format such as, for example, binary data, comma delimited data, tab delimited data, structured query language (SQL) structures, etc. While in the illustrated example the database 120 is illustrated as a single database, the database 120 may be implemented by multiple databases.

The framework generator 125 of the illustrated example tests queries used by the application 105 to determine if those queries should be modified for use with the database driver 115 and/or the database 120. Based on the result of the tests, the framework generator 125 generates the database access framework 110.

Figure 2:
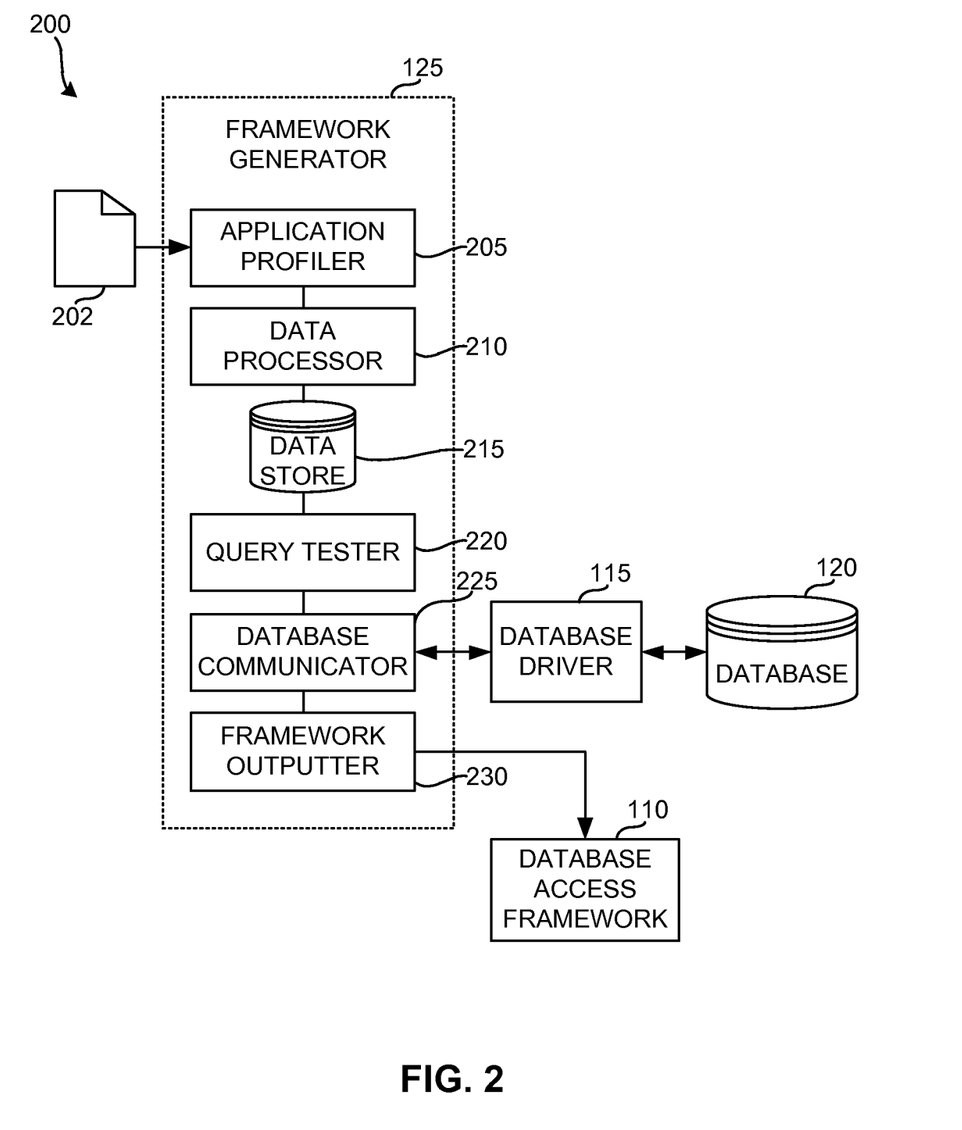
FIG. 2 is block diagram of the example framework generator of FIG. 1.

FIG. 2 is block diagram 200 of the example framework generator 125 of FIG. 1. The example framework generator 125 of the illustrated example includes an application profiler 205, a data processor 210, a data store 215, a query tester 220, a database communicator 225, and a framework outputter 230.

The framework generator 125 of the illustrated example receives an application profile 202. The application profile 202 of the illustrated example is a file that describes the query(ies) that are expected to be used by the application 105. In the illustrated example, the application profile 202 is created by developers of the application 105 during development of the application 105. However, the application profile 202 may be created at any other time and/or by any other party. For example, the application profile 202 may be created by a third-party developer after release of the application 105. Further, in the illustrated example, the application profile 202 includes expected results of the query(ies). In some examples, the expected result is not included in the application profile 202. In such examples, the expected result may be a result that indicates that the query executed successfully. In the illustrated example, the expected result includes specific results (e.g., a data field, etc.) that are to be returned when a particular query is executed. However, in some examples, the expected result might be a result indicating that the query executed successfully.

The application profiler 205 of the illustrated example inspects the application profile 202 to determine the query(ies) that are expected to be used by the application 105. However, in some examples the application profiler 205 may directly inspect the application 105. For example, the application profiler 205 may inspect a source code of the application 105 to determine the queries that are expected to be used by application 105.

The data processor 210 of the illustrated example determines which queries are to be tested. Further, the data processor 210 instructs the query tester 220 to test the queries. Based on the results of the tests, the data processor 210 stores templates based on the results of the queries tested by the query tester 220.

The data store 215 of the illustrated example is a database for storing testing information. However, the data store 215 may be any device for storing data such as, for example, flash memory, magnetic media, optical media, etc. Furthermore, the data stored in the data store 215 may be in any data format such as, for example, binary data, comma delimited data, tab delimited data, structured query language (SQL) structures, etc. While in the illustrated example the data store is illustrated as a single database, the data store 215 may be implemented by multiple databases.

The query tester 220 of the illustrated example transforms and/or translates a query used by the application 105 to a syntax that might return expected results when the query is executed. The query tester 220 of the illustrated example passes queries to be executed to the database communicator 225. Further, the query tester 220 of the illustrated example validates a returned result of the translated query to determine if the returned result matches an expected result of the query.

Figure 7:
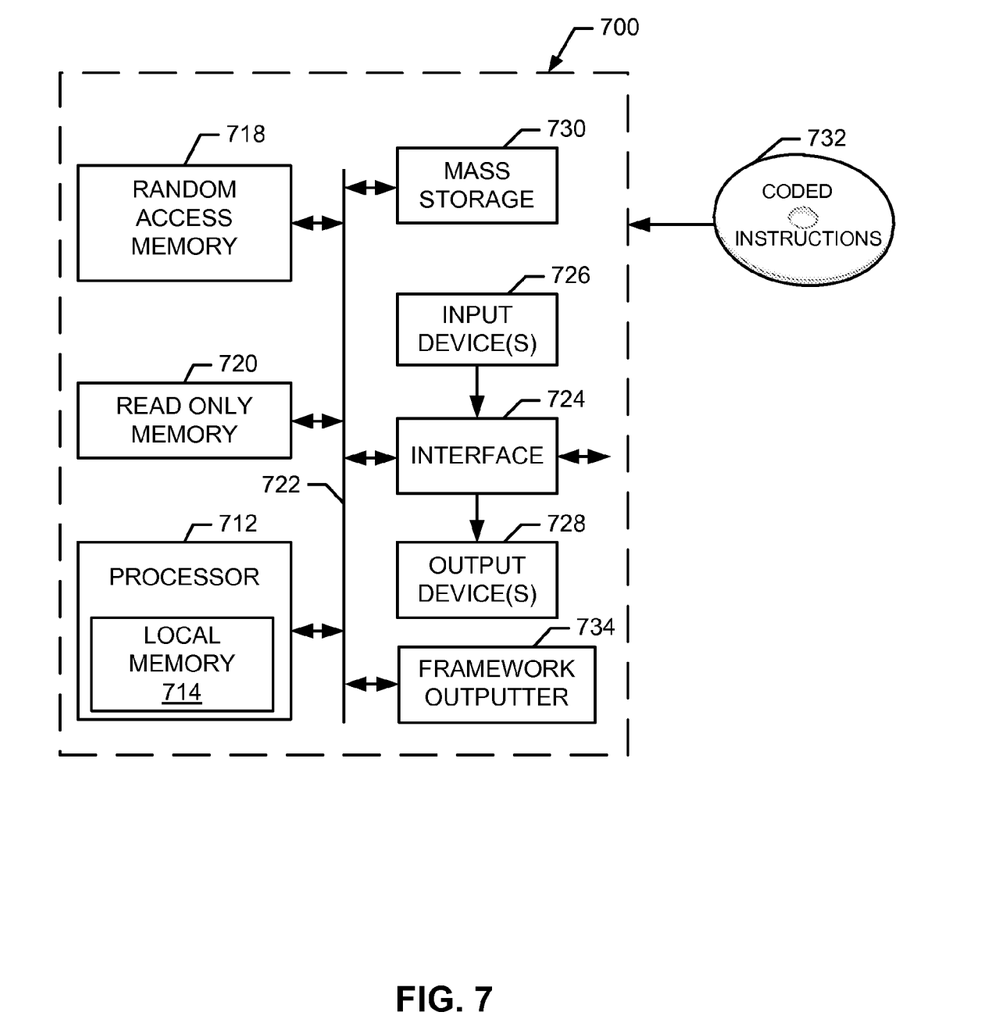
FIG. 7 is a block diagram of an example computer that may execute, for example, the machine-readable instructions of FIGS. 4 and 5 to implement the example framework generator of FIGS. 1 and 2, and/or the machine-readable instructions of FIG. 6 to implement the example database access framework of FIGS. 1 and 3.

The database communicator 225 of the illustrated example is implemented by a communications interface such as, for example, the interface 724 of FIG. 7. In the illustrated example, the database communicator enables communication with the database 120 via the database driver 115. In the illustrated example, the database communicator 225 communicates with the database driver 115 via a network interface. In some examples, the database communicator 225 is local to the database driver 115 (e.g., executed by the same computing system), while in some examples, the database communicator 225 is remote from the database driver 115 (e.g., executed by a different computing system). The database communicator 225 receives a query(ies) from the query tester, and upon executing the query(ies) against the database 120 via the database driver 115, returns a result to the query tester 220.

The framework outputter 230 of the illustrated example generates the example database access framework 110. In the illustrated example, the framework outputter 230 installs the database access framework 110 on a system executing the application 105 such that the database access framework 110 passes translated queries to the database driver 115. In some examples, the database access framework 110 is installed on a system other than the system executing the application 105 such as, for example, a system executing the database driver 115, a system executing the database 120, any other system, etc. In some examples, the framework outputter 230 instructs a user (e.g., an operator, an installer, etc) to install the database access framework 110. Further, in the illustrated example, the framework outputter 230 configures the application 105 to transmit queries to the database access framework 110 instead of, for example, the database driver 115. Additionally or alternatively, the framework outputter 230 may instruct the user to configure the application 105 to transmit queries to the database access framework 110.

Figure 3:
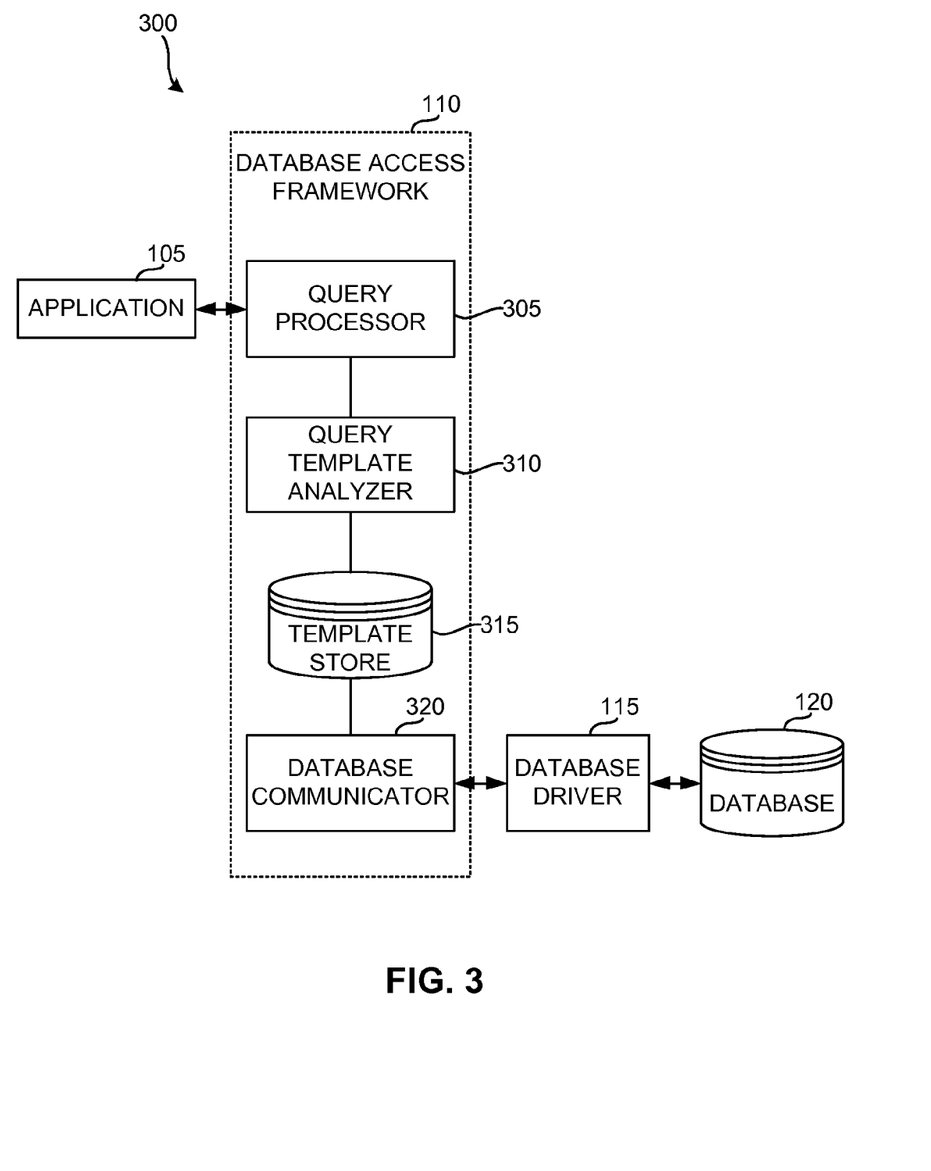
FIG. 3 is a block diagram of the example database access framework of FIG. 1.

FIG. 3 is a block diagram 300 of the example database access framework 110 of FIG. 1. The example database access framework 110 of FIG. 3 includes a query processor 305, a query template analyzer 310, a template store 315, and a database communicator 320.

The query processor 305 of the illustrated example receives a query(ies) from the application 305. The query(ies) received from the application 305 are passed to the query template analyzer 310 which translates the query(ies) and passes the translated query(ies) on to the database communicator 320. In the illustrated example, a result of the executed query(ies) is then received by the query processor 305 which then returns the result to the application 105.

The query template analyzer 310 of the illustrated example inspects the query(ies) received by the query processor 305 to determine an appropriate template to be applied to the query. In the illustrated example, templates are stored in the template store 315. In the illustrated example, the query template analyzer 310 analyzes the received query(ies) against the template store 315 to determine if a query should be translated, and if so, applies the query template to the received query.

The template store 315 of the illustrated example is a database for storing template data. However, the template store 315 may be any device for storing data such as, for example, flash memory, magnetic media, optical media, etc. Furthermore, the data stored in the template store 315 may be in any data format such as, for example, binary data, comma delimited data, tab delimited data, structured query language (SQL) structures, etc. While in the illustrated example the template store 315 is illustrated as a single database, the template store 315 may be implemented by multiple databases. In the illustrated example, the template store 315 is populated by the framework outputter 230 of the framework generator 125.

The database communicator 320 of the illustrated example is implemented by an interface such as, for example, the interface 724 of FIG. 7. In the illustrated example, the database communicator 320 communicates with the database driver 115 via a network interface. In some examples, the database communicator 320 is local to the database driver 115 (e.g., executed by the same computing system), while in some examples, the database communicator 320 is remote from the database driver 115 (e.g., executed by a different computing system).

The database communicator 320 of the illustrated example enables communication with the database 120 via the database driver 115. In the illustrated example, the database communicator 320 receives a query(ies) from the query template analyzer 310 and executes the query(ies) against the database 120 via the database driver 115. The database communicator 320 then receives a result of the query(ies), and passes the result to the query processor 305.

While an example manner of implementing the framework generator 125 of FIGS. 1 and 3 and/or the database access framework 110 of FIGS. 1 and 2 has been illustrated in FIGS. 1, 2, and 3, one or more of the elements, processes and/or devices illustrated in FIGS. 1, 2, and 3 may be combined, divided, re-arranged, omitted, eliminated and/or implemented in any other way. Further, the example application profiler 205, the example data processor 210, the example data store 125, the example database communicator 225, and/or the example framework outputter 230, and/or more generally the example framework generator 125 of FIGS. 1 and 2, and/or the example query processor 305, the example query template analyzer 310, the example template store 315, the example database communicator 320, and/or more generally the example database access framework 110 of FIGS. 1 and 3 may be implemented by hardware, software, firmware and/or any combination of hardware, software and/or firmware. Thus, for example, any of the example application profiler 205, the example data processor 210, the example data store 125, the example database communicator 225, and/or the example framework outputter 230, and/or more generally the example framework generator 125 of FIGS. 1 and 2, and/or the example query processor 305, the example query template analyzer 310, the example template store 315, the example database communicator 320, and/or more generally the example database access framework 110 of FIGS. 1 and 3 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the appended apparatus claims are read to cover a purely software and/or firmware implementation, at least one of the example application profiler 205, the example data processor 210, the example data store 125, the example database communicator 225, and/or the example framework outputter 230 of the example framework generator 125 of FIGS. 1 and 2, and/or the example query processor 305, the example query template analyzer 310, the example template store 315, the example database communicator 320 of the example database access framework 110 of FIGS. 1 and 3 are hereby expressly defined to include a computer-readable medium such as a memory, DVD, CD, etc. storing the software and/or firmware. Further still, the example application profiler 205, the example data processor 210, the example data store 125, the example database communicator 225, and/or the example framework outputter 230 of the example framework generator 125 of FIGS. 1 and 2, and/or the example query processor 305, the example query template analyzer 310, the example template store 315, the example database communicator 320 of the example database access framework 110 of FIGS. 1 and 3 may include one or more elements, processes and/or devices in addition to, or instead of, those illustrated in FIGS. 1, 2, and 3, and/or may include more than one of any or all of the illustrated elements, processes and devices.

Figure 4:
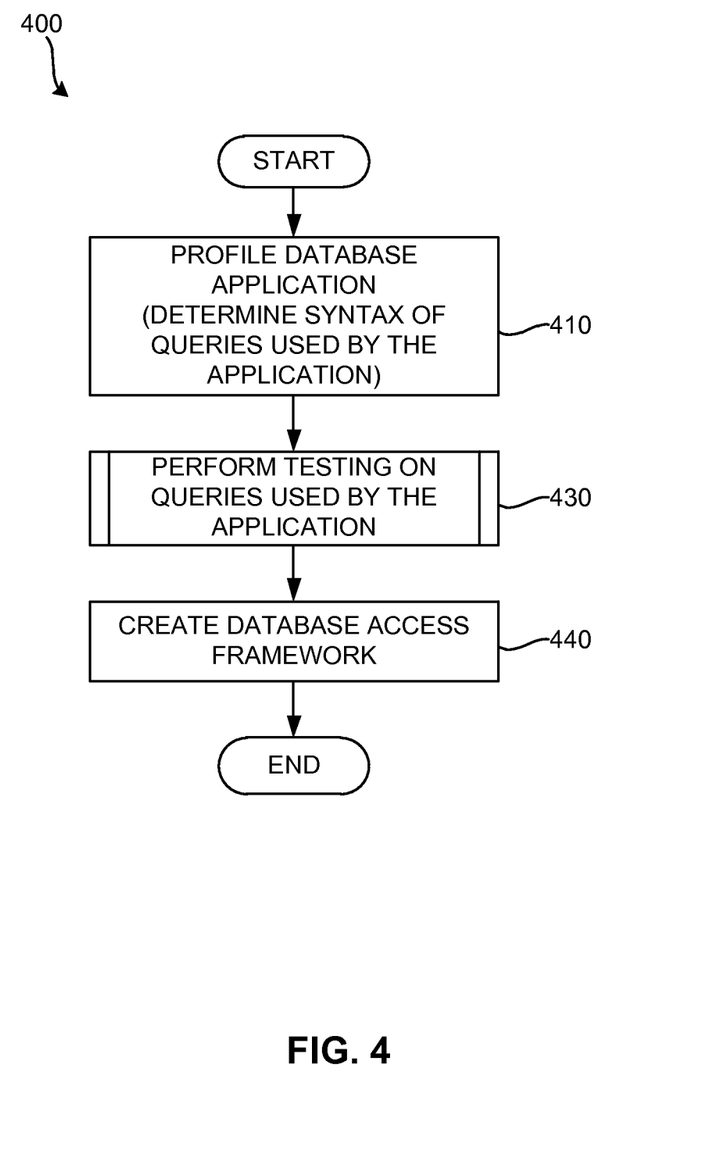
FIG. 4 is a flowchart representative of example machine-readable instructions that may be executed to implement the example framework generator of FIGS. 1 and 2.
Figure 5:
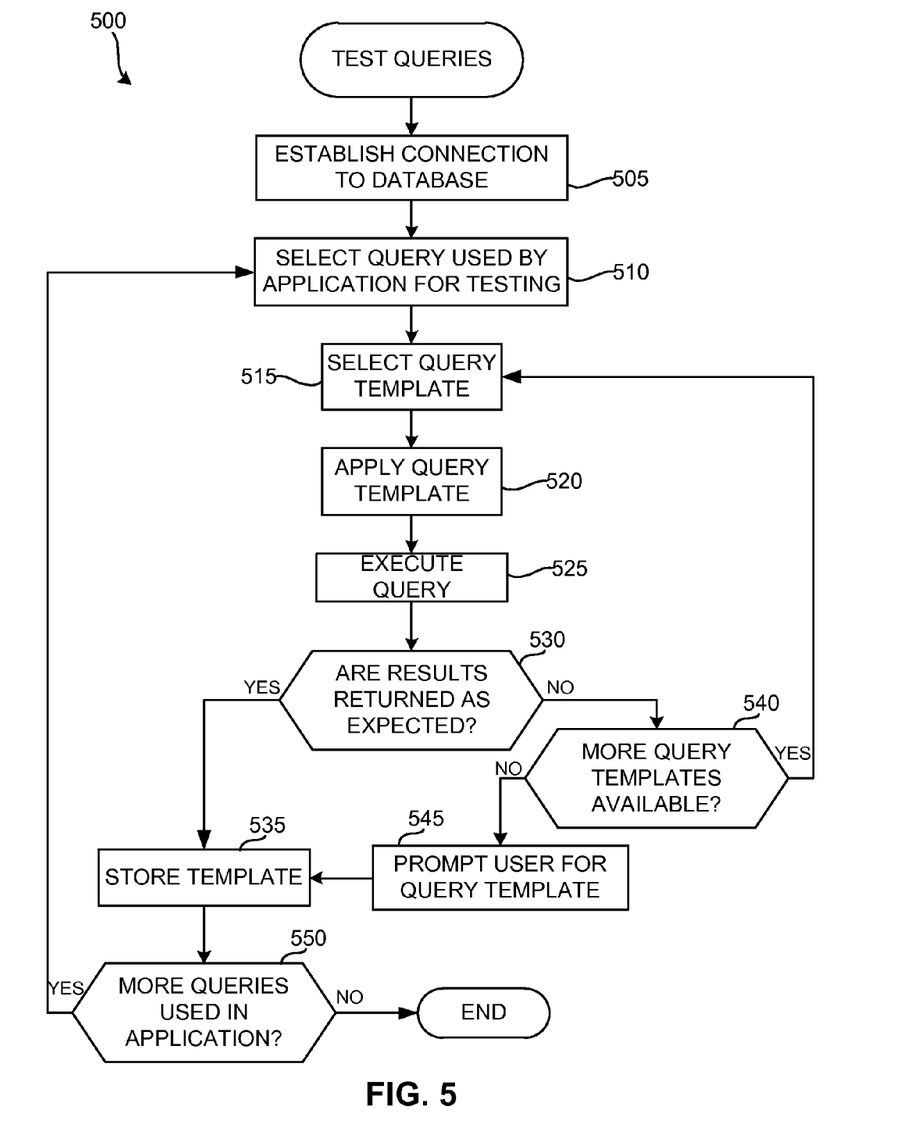
FIG. 5 is a flowchart representative of example machine-readable instructions that may be executed to implement the example framework generator of FIGS. 1 and 2.
Figure 6:
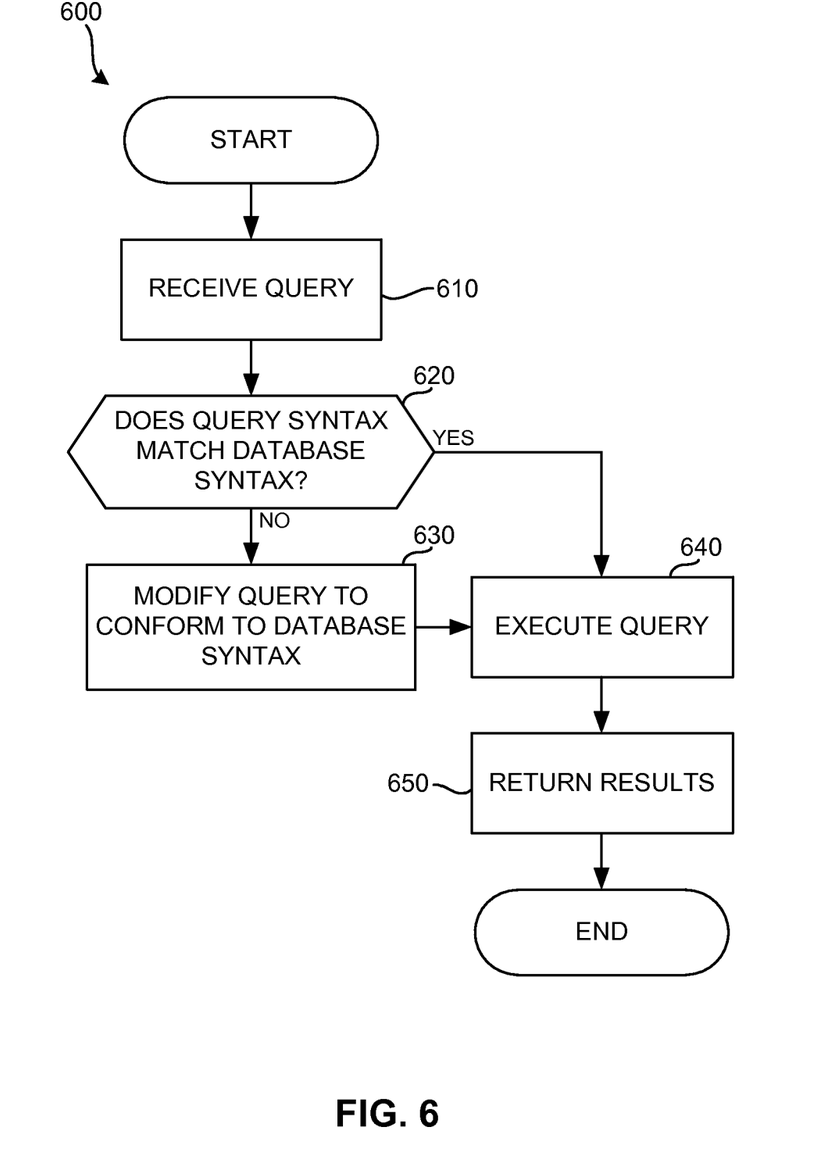
FIG. 6 is a flowchart representative of example machine-readable instructions that may be executed to implement the example database access framework of FIGS. 1 and 3.

Flowcharts representative of example machine-readable instructions for implementing the framework generator 125 of FIGS. 1 and 2 and/or the database access framework 110 of FIGS. 1 and 3 are shown in FIGS. 4, 5 and 6. In these examples, the machine-readable instructions comprise a program(s) for execution by a processor(s) such as the processor 712 shown in the example processor platform 700 discussed below in connection with FIG. 7. The program may be embodied in software stored on a computer-readable medium such as a CD-ROM, a floppy disk, a hard drive, a digital versatile disk (DVD), or a memory associated with the processor 712, but the entire program and/or parts thereof could alternatively be executed by a device other than the processor 712 and/or embodied in firmware or dedicated hardware. Further, although the example program(s) is described with reference to the flowcharts illustrated in FIGS. 4, 5, and 6, many other methods of implementing the framework generator 125 of FIGS. 1 and 2 and/or the database access framework 110 of FIGS. 1 and 3 may additionally and/or alternatively be used. For example, the order of execution of the blocks may be changed, and/or some of the blocks described may be changed, eliminated, or combined.

As mentioned above, the example processes of FIGS. 4, 5, and/or 6 may be implemented using coded instructions (e.g., computer-readable instructions) stored on a tangible computer-readable medium such as a hard disk drive, a flash memory, a read-only memory (ROM), a compact disk (CD), a digital versatile disk (DVD), a cache, a random-access memory (RAM) and/or any other storage media in which information is stored for any duration (e.g., for extended time periods, permanently, brief instances, for temporarily buffering, and/or for caching of the information). As used herein, the term tangible computer-readable medium is expressly defined to include any type of computer-readable storage and to exclude propagating signals. Additionally or alternatively, the example processes of FIGS. 4, 5, and/or 6 may be implemented using coded instructions (e.g., computer-readable instructions) stored on a non-transitory computer-readable medium such as a hard disk drive, a flash memory, a read-only memory, a compact disk, a digital versatile disk, a cache, a random-access memory and/or any other storage media in which information is stored for any duration (e.g., for extended time periods, permanently, brief instances, for temporarily buffering, and/or for caching of the information). As used herein, the term non-transitory computer-readable medium is expressly defined to include any type of computer-readable medium and to exclude propagating signals.

FIG. 4 is a flowchart representative of example machine-readable instructions 400 that may be executed to implement the example framework generator 125 of FIGS. 1 and 2. FIG. 4 illustrates a process wherein the framework generator 125 receives a profile of the application 105, tests queries against the database 120 via the database driver 115, and generates the database access framework 110.

The example machine-readable instructions 400 of FIG. 4 begin when the application profiler 205 receives the profile 202 of the application (block 410). In the illustrated example, the profile 202 is a file that indicates queries and/or types of queries that are used by the application 105. In some examples, the application profiler 205 receives an executable file (e.g., an executable containing the application) and derives queries and/or types of queries that are used by the application 105. In the illustrated example, the application profiler 205 determines the syntax of the queries and/or types of queries that are used by the application 105. Determining and/or parsing the syntax of the queries and/or query types that are used by the application 105 allows for easy translation from a first syntax to a second syntax. In some examples, the syntax is not determined until a later point (e.g., during testing).

The data processor 210 and/or query tester 220 then test the queries and/or query types used by the application 105 (block 430). The query testing procedure is described in more detail in FIG. 5. In short, the data processor 210 and/or query tester 220 determine an appropriate query template to be used with the database 120 and/or database driver 115 for each query and/or query type used by the application.

Once the data processor 210 and/or query tester 220 have tested the query(ies) and/or query type(s) used by the application 105, the framework outputter 230 creates the database access framework 110 (block 440). In the illustrated example, the framework outputter 230 populates the template store 315 of the database access framework 110, while one or more other components of the database access framework 110 are pre-compiled. The process of FIG. 4 is then complete and the application 105 routes queries to the database 120 via the database access framework 110. In some examples, the framework outputter 230 compiles one or more components of the database access framework 110 when outputting the database access framework 110.

In some examples, creating the database access framework may additionally include installing the database access framework on the system executing the application 105. However, in some examples, the database access framework 110 is not installed. In some examples, installing the database access framework 110 includes configuring the application 105 to route queries through the database access framework 110 and configuring the database access framework to route queries through the database driver 115. In some examples, the installation is performed programmatically. However, in some other examples, the installation is performed by presenting instructions to a user (e.g., an operator, an installer, etc.). In some such examples, the instructions instruct and/or show the user how to install the database access framework 105.

FIG. 5 is a flowchart representative of example machine-readable instructions that may be executed to implement the example framework generator of FIGS. 1 and 2. FIG. 5 illustrates a process wherein the framework generator 125 tests query templates to determine an appropriate template to be used for each query type used by the application 105.

The example machine-readable instructions 500 of FIG. 5 begin when the database communicator 225 establishes a connection with the database 120 via the database driver 115 (block 505). In the illustrated example, database connectivity details (e.g., a name of the database, an instance of the database, a connection string associated with the database, etc.) are received by the application profiler 205 when the profile 202 is received in block 410. In some examples, the database communicator 225 prompts a user (e.g., an operator, an installer, etc.) for the database connectivity details.

The data processor 210 selects a query used by the application (block 510). The analyzed results of the application profiler 205 are stored in the data store 215 in block 410, and include queries and/or test queries, and/or expected results of those queries and/or test queries. In the illustrated example, the query is retrieved from the data store 215. In some examples, the query to be tested is a "CREATE TABLE" statement (e.g., a DDL statement). However, any query and/or or query type may be tested such as, for example, a SELECT statement (e.g., a DML statement), an INSERT statement, etc. In particular, they query and/or query type of some examples may be for retrieving metadata from the database 120. In the illustrated example, the processor selects a query template from the data store 215 (block 515). The query template is selected based on an association with one or more identifiers in the query to be tested. In some examples, the query template may be "CREATE TABLE %TABLE_CATALOG%.%TABLE_NAME% (%COLUMN_DEFINITION%)". In such an example, the tokens "%TABLE_CATALOG%", "%TABLE_NAME%", and "%COLUMN_DEFINITION%" are tokens that are replaced based on tokens that are identified in the query. However, any other tokens and/or syntax may additionally or alternatively be used. The data processor 210 then applies the selected query template to the query to be tested (block 520).

The transformed query is then executed on the database 120 via the database driver 115 by the query tester 220 (block 525). In the illustrated example, the query tester 220 receives a result of the transformed query. The result of the transformed query is compared against an expected result of the pre-transformation version of the query by the query tester

220 (block 530). If the results are returned as expected, the query template is stored by the data processor 210 in the data store 215 (block 535). If the results are not returned as expected, the data processor 210 determines whether more query templates are available (block 540). If more query templates are available, control returns to block 515, where the processor selects another query template and repeats testing of the query template. If more query templates are not available, the data processor 210 prompts a user (e.g., an operator, an installer, etc.) to enter a query template (block 545). In the illustrated example, control then proceeds to block 535 where the query template received from the user is stored. However, in some examples, control proceeds to block 520, where the query template received from the user is applied to the query to be tested, and the transformed query undergoes testing.

After the query template is stored in block 535, the data processor determines if another query(ies) are used by the application 105 (block 550). If there is another query(ies) that is used by the application 105, control proceeds to block 510 where the data processor 210 determines the query to be tested, and proceeds to test the query. If there are no more queries to be tested, the example process of FIG. 5 terminates and control proceeds to block 440 of FIG. 4.

FIG. 6 is a flowchart representative of example machine-readable instructions 600 that may be executed to implement the example database access framework 110 of FIGS. 1 and 3. FIG. 6 illustrates a process wherein the database access framework 110 receives a query(ies) from the application 105, translates the received query(ies), and executes the query(ies) on the database 120 via the database driver 115.

The example machine-readable instructions 600 of FIG. 6 begin when the query processor 305 of the database access framework 110 receives a query from the application 105 (block 610). The query template analyzer 310 determines whether a syntax of the received query matches a syntax of the database 120 and/or the database driver 115 (block 620). If the query syntax of the received query matches the syntax of the database 120 and/or the database driver 115, no transformation of the query syntax based on a stored query template should be performed and control proceeds to block 640 where the database communicator 320 executes the query. If the query syntax of the received query does not match the syntax of the database 120 and/or the database driver 115, the syntax of the query is translated to conform to the syntax of the database 120 and/or the database driver 115 (block 630). In the illustrated example, the query is translated by the query template analyzer 310 based on a query template stored in the template store 315. After the query syntax is translated, the database communicator 320 executes the translated query (block 640). The database communicator 320 then returns a received result of the query to the application 105.

FIG. 7 is a block diagram of an example processor platform 700 capable of executing the instructions of FIGS. 4, 5, and/or 6 to implement the framework generator 125 of FIGS. 1 and 2 and/or the database access framework 110 of FIGS. 1 and 3 of FIGS. 1, 2, and 3. The processor platform 700 can be, for example, a server, a personal computer, an Internet appliance, or any other type of computing device.

The system 700 of the instant example includes a processor 712. For example, the processor 712 can be implemented by one or more Intel® microprocessors from the Pentium® family, the Itanium® family or the XScale® family. Of course, other processors from other families are also appropriate.

The processor 712 is in communication with a main memory 714, including a volatile memory 718 and a non-volatile memory 720 via a bus 722. The volatile memory 718 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 718 may be implemented by flash memory and/or any other desired type of memory device. Access to the main memory 714, 718, and/or 720 is typically controlled by a memory controller.

The processor platform 700 also includes an interface circuit 724. The interface circuit 724 may be implemented by any type of interface standard, such as an Ethernet interface, a universal serial bus (USB), and/or a PCI express interface.

One or more input devices 726 are connected to the interface circuit 724. The input device(s) 726 permit a user to enter data and commands into the processor 712. The input device(s) can be implemented by, for example, a keyboard, a mouse, a touchscreen, a track-pad, a trackball, isopoint and/or a voice recognition system.

One or more output devices 728 are also connected to the interface circuit 724. The output devices 728 can be implemented, for example, by display devices (e.g., a liquid crystal display, a cathode ray tube display (CRT), a printer and/or speakers). The interface circuit 724, thus, typically includes a graphics driver card.

The interface circuit 724 also includes a communication device (e.g., the database communicator 230, the database communicator 320, etc.) such as a modem or network interface card to facilitate exchange of data with external computers via a network (e.g., an Ethernet connection, a digital subscriber line (DSL), a telephone line, coaxial cable, a cellular telephone system, etc.).

The processor platform 700 also includes one or more mass storage devices 730 for storing software and data. Examples of such mass storage devices 730 include floppy disk drives, hard drive disks, compact disk drives and digital versatile disk (DVD) drives. The mass storage device 730 may implement the database 120, the data store 215, and/or the template store 315.

In the illustrated example, the processor platform 700 also includes a framework outputter 734 such as, for example the framework generator 125 of FIGS. 1 and 2. The framework outputter 734 of the illustrated example is in communication with the processor 712 and/or the memory (e.g., the main memory 714, the volatile memory 718, and/or the non-volatile memory 720, the mass storage 730, etc.) via the bus 722. In the illustrated example, once a query template is stored, the framework outputter 734 outputs a database access framework to interface an application and a database driver to translate queries based on a stored query template(s).

The coded instructions of FIGS. 4, 5, and 6 may be stored in the mass storage device 730, in the volatile memory 718, in the non-volatile memory 720, and/or on a removable storage medium such as a CD or DVD.

From the foregoing, it will be appreciated that above disclosed methods, apparatus, and articles of manufacture allows a application to operate with a database using any query syntax.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:
1. A method to interface an application to a database, the method comprising:

accessing an application profile identifying (1) a query used by the application that is to communicate with the database via a database driver and (2) an expected result of the query;

executing a plurality of test queries on the database via the database driver, the test queries based on respective ones of a plurality of query templates and the query, the test queries used to determine whether a syntax of one of the test queries matches a syntax used by the database;

when a received result of the first test query does not match the expected result of the query, generating a transformed test query;

when a received result of the first test query or the transformed test query matches the expected result of the query, selecting a corresponding one of the query templates that is associated with the matching one of the first test query or the transformed test query of the plurality of test queries; and generating, based on the selected query template, a database access framework to interface between the application and the database driver to respond to future queries to the database.

2. The method as described in claim 1, wherein the plurality of test queries is a first plurality of test queries, and further including generating a second plurality of test queries based on the respective ones of the plurality of query templates and a second query.

3. The method as described in claim 1, wherein the generating of the database access framework further comprises installing the database access framework to route queries from the application to the database driver.

4. A tangible machine-readable medium comprising instructions which, when executed, cause a machine to at least:

access an application profile identifying (1) a query used by an application that is to communicate with a database via a database driver and (2) an expected result of the query;

execute a plurality of test queries on the database via the database driver, the test queries based on respective ones of a plurality of query templates and the query, the test queries used to determine whether a syntax of one of the test queries matches a syntax used by the database;

when a received result of the first test query does not match the expected result of the query, generate a transformed test query;

when a received result of the first test query or the transformed test query matches the expected result of the query, select a corresponding one of the query templates that is associated with the matching one of the first test query or the transformed test query of the plurality of the test queries; and generate, based on the selected query template, a database access framework to interface between the application and the database driver to access a database in response to a future query from a user.

5. The tangible machine-readable medium as described in claim 4, wherein the plurality of test queries is a first plurality of test queries, and wherein the instructions, when executed, cause the machine to generate a second plurality of test queries based on the respective ones of the plurality of query templates and a second query.

6. The tangible machine-readable medium as described in claim 5, wherein the instructions, when executed, cause the machine to at least:

execute the second plurality of test queries on the database via the database driver; and select a second query template associated with a second test query of the second plurality of test queries when a received result of the second test query matches an expected result of the second query.

7. The tangible machine-readable medium as described in claim 4, wherein the instructions, when executed, cause the machine to at least:

access a user provided query template; and select the user provided query template when none of results associated with the plurality of test queries match the expected result of the query.

8. The tangible machine-readable medium as described in claim 7, wherein the user provided query template is received by prompting a user for the user provided query template and receiving a response.

9. The tangible machine-readable medium as described in claim 7, wherein the instructions, when executed, cause the machine to at least:

generate a second test query based on the user provided query template and the query;

execute the translated query on the database via the database driver; and select the user provided query template when a received result of the translated query matches the expected result of the query.

10. An apparatus to interface an application to a database, the apparatus comprising:

an application profiler to access an application profile identifying (1) a query used by the application and (2) an expected result of the query;

a data store to store a plurality of query templates to transform a syntax of the query to a plurality of syntaxes of the database;

a query tester to generate a plurality of test queries based on respective ones of the plurality of query templates and the query, the query tester to use the test queries to determine whether a syntax of one of the test queries matches a syntax used by the database, the query tester to execute the test queries, the query tester to, when a received result of the first test query does not match the expected result of the query, generating a transformed test query, and the query tester to, when a received result of the first test query or the transformed test query matches the expected result of the query, select a corresponding one of the query templates that is associated with the matching one of the first test query or the transformed test query of the plurality of test queries;

a database communicator to execute the test queries on the database and receive respective results of the respective test queries; and a database framework outputter to output a database access framework based on the selected query template, at least one of the application profiler, the query tester, the database communicator, and the database framework outputter being implemented by a processor.

11. The apparatus as described in claim 10, further comprising a data processor to:

select the query to test on the database;

instruct the query tester to test the query; and store the first query template.

12. The apparatus as described in claim 10, wherein the database access framework is to receive a second query from the application and to translate the syntax of the query to the syntax of the database.

13. The apparatus as described in claim 10, wherein the database framework outputter is to install the database access framework on a system executing the application to interface between the application and a database driver.

14. The apparatus as described in claim 10, wherein the database communicator is to communicate with the database via a database driver.

15. The apparatus as described in claim 14, wherein the database driver comprises a Java database connectivity driver.

* * * * *